(12) United States Patent
Irie

(10) Patent No.: US 7,929,067 B2
(45) Date of Patent: Apr. 19, 2011

(54) LIQUID CRYSTAL COMPONENT MODULE AND METHOD OF CONTROLLING DIELECTRIC CONSTANT

(75) Inventor: Yasuyuki Irie, Kawasaki (JP)

(73) Assignee: Kyocera Corporation, Kyoto (JP)

( * ) Notice: Subject to any disclaimer, the term of this patent is extended or adjusted under 35 U.S.C. 154(b) by 972 days.

(21) Appl. No.: 11/719,205

(22) PCT Filed: Dec. 16, 2005

(86) PCT No.: PCT/JP2005/023161
§ 371 (c)(1),
(2), (4) Date: May 11, 2007

(87) PCT Pub. No.: WO2006/068056
PCT Pub. Date: Jun. 29, 2006

(65) Prior Publication Data
US 2009/0073332 A1 Mar. 19, 2009

(30) Foreign Application Priority Data
Dec. 20, 2004 (JP) .................................. 2004-367929

(51) Int. Cl.
G02F 1/133 (2006.01)
(52) U.S. Cl. ........................................................ 349/21
(58) Field of Classification Search ................... 349/183, 349/21–22
See application file for complete search history.

(56) References Cited

U.S. PATENT DOCUMENTS
| | | | |
|---|---|---|---|
| 6,335,699 B1 | 1/2002 | Honma | 342/4 |
| 2003/0043336 A1* | 3/2003 | Sasaki et al. | 349/187 |

FOREIGN PATENT DOCUMENTS
| | | | |
|---|---|---|---|
| JP | 62212620 A | * | 9/1987 |
| JP | 03074909 A | | 3/1991 |
| JP | 11-154821 | | 6/1999 |
| JP | 11-284407 | | 10/1999 |
| JP | 2000341027 A | | 12/2000 |
| JP | 2001-119225 | | 4/2001 |

OTHER PUBLICATIONS

Japanese language notice of allowance and its English language translation for corresponding Japanese application 2004367929 lists the references above, Feb. 2006.

* cited by examiner

Primary Examiner — James A Dudek
(74) Attorney, Agent, or Firm — DLA Piper LLP (US)

(57) ABSTRACT

A liquid crystal component module comprises a liquid crystal dielectric layer, first and second electrically conductive layers disposed to oppose each other with the liquid crystal dielectric layer interposed therebetween, a voltage applying device which applies a DC voltage to the liquid crystal dielectric layer so as to control the dielectric constant of the liquid crystal dielectric layer, a temperature regulating element for changing the temperature of the liquid crystal dielectric layer, and a temperature control device which changes the temperature of the liquid crystal dielectric layer by means of the temperature regulating element so as to cause transition of the liquid crystal dielectric layer between solid phase and liquid phase.

9 Claims, 11 Drawing Sheets $Z_1, Z_2, Z_3$ : CHARACTERISTIC IMPEDANCE

DIELECTRIC CONSTANT OF MBBA (22°C, 1.592kHz)

$\varepsilon_{//}$ DIELECTRIC CONSTANT IN DIRECTION
OF AXIS OF SYMMETRY $\varepsilon_{\perp}$ DIELECTRIC CONSTANT IN DIRECTION
PERPENDICULAR TO AXIS OF SYMMETRY

LIQUID CRYSTAL COMPONENT MODULE AND METHOD OF CONTROLLING DIELECTRIC CONSTANT

TECHNICAL FIELD

The present invention relates to a liquid crystal component module for controlling the dielectric constant of a liquid crystal dielectric layer formed from a dielectric material, and a method of controlling a dielectric constant employed therein.

This application claims priority on Japanese Patent Application No. 2004-367929 filed on Dec. 20, 2004, the disclosure of which is incorporated by reference herein.

BACKGROUND ART

Electronic apparatuses such as portable communications terminals of mobile communications system which use high frequencies (such as microwave band) employ a large number of electronic components constituted from dielectric materials.

In transmission paths, resonating circuits and filter circuits, for example, microstrip lines shown in FIG. 13 are used. The microstrip line is constituted from a ground surface (ground line) 4, an electrically conductive layer 1 (circuit pattern) and a dielectric layer 2 interposed therebetween. Characteristic impedance of the microstrip line is determined by width W of the electrically conductive layer 1, thickness t, distance between electrical conductors, thickness d of the dielectric layer 2 and relative dielectric constant $\varepsilon_r$ thereof. A dielectric resonator antenna shown in FIG. 14 is constituted by interposing the dielectric layer 2 between an antenna pattern 14 and the ground surface 4, and radiates electromagnetic wave when a high-frequency signal is supplied to an antenna feeding point 6.

There is a method proposed for changing the electrical characteristics of a component by changing the dielectric constant of the dielectric member in a microstrip line or a dielectric resonator antenna which uses a dielectric material. For example, a characteristic impedance $Z_0$ of the microstrip line shown in FIG. 13 can be given by the following equation.

When $W/d \leq 1.0$:

$$Z0 = \frac{60}{\sqrt{\varepsilon e}} \cdot \ln\left[\frac{8d}{W} + \frac{W}{4d}\right]$$

$$\varepsilon e = \frac{\varepsilon r + 1}{2} + \frac{\varepsilon r - 1}{2} \cdot \left[\frac{1}{\sqrt{1 + 12d/W}} + 0.04\left(1 - \frac{W}{d}\right)^2\right]$$

When $W/d \geq 1.0$:

$$Z0 = \frac{120}{\sqrt{\varepsilon e}} \cdot \left[\frac{W}{d} + 1.393 + 0.667 + \ln\left(\frac{W}{d} + 1.444\right)\right]^{-1}$$

$$\varepsilon e = \frac{\varepsilon r + 1}{2} + \frac{\varepsilon r - 1}{2} \cdot \frac{1}{\sqrt{1 + 12d/W}}$$

Thus characteristic impedance $Z_0$ of the microstrip line is determined by three variables of d (thickness) which is a geometrical parameter, W (line width) and dielectric constant $\varepsilon$ (or relative dielectric constant $\varepsilon_r$) of the dielectric material. It is in practice to change the dielectric constant of the dielectric material, among these parameters, so as to control the electrical characteristics of the microstrip line.

There have been two conventional methods for controlling the dielectric constant. One is to change the voltage and temperature of a solid dielectric material thereby to change the dielectric constant, and the other is to apply a voltage to a liquid crystal thereby to change the dielectric constant. Of the two methods, one that employs liquid crystal as the dielectric material will be described below.

FIG. 15 shows an example of the constitution of a microstrip line of the prior art where the dielectric constant of a dielectric material is changed. In FIG. 15, direction of polarization of a liquid crystal dielectric layer 7 with no voltage applied thereto is determined by the direction of a rubbing surface 3 (direction of orientation). When a voltage is applied from a dielectric constant control voltage source 35 to the liquid crystal dielectric layer 7, orientation of the liquid crystal molecules within the liquid crystal dielectric layer 7 changes due to the influence of the electric field generated by the voltage, so that the dielectric constant changes. Thus dielectric constant is changed so as to obtain the desired characteristics, by applying the voltage to the liquid crystal dielectric layer 7.

It should be noted that a prior art technology aimed at providing an antenna apparatus which enables operation over a broader frequency band by making the resonant frequency of the antenna variable (refer to, for example, Patent Document 1). The antenna apparatus comprises an antenna and a radio transceiver which feeds transmission signal to and receives reception signal from the antenna, wherein the antenna is provided with a dielectric member of which relative dielectric constant changes in response to a frequency control voltage Ec, while the frequency control voltage Ec applied to the dielectric member is controlled.

Patent Document 1: Japanese Unexamined Patent Publication, First Publication No. H11-154821

DISCLOSURE OF THE INVENTION

Problem to be Solved by the Invention

In the microstrip line of the prior art shown in FIG. 15, dielectric constant of the liquid crystal dielectric layer 7 is determined by applying a constant voltage to the liquid crystal dielectric layer 7. Accordingly, dielectric constant of the liquid crystal dielectric layer 7 is caused to change also by the signal supplied to the microstrip line. In case the signal includes a direct current component, in particular, the signal causes a more significant influence. Also in case an electric component which uses the liquid crystal dielectric layer 7 is used in a place which is affected by physical vibration, dielectric constant of the liquid crystal dielectric layer 7 changes with time, thus posing a problem to be solved when it is desired to maintain a constant value of the dielectric constant. The dielectric resonator antenna of the prior art disclosed in patent document 1 also has such a problem that it is difficult to control the dielectric constant in a stable manner.

The present invention has been conceived in view of the problems described above, and has an object of providing a liquid crystal component module capable of maintaining the dielectric constant of a liquid crystal dielectric layer in a stable manner, and a method of controlling a dielectric constant of the liquid crystal component module.

Means for Solving Problem

The present invention is intended to solve the problems described above, and a first embodiment of the present invention is a liquid crystal component module comprising a liquid crystal dielectric layer, first and second electrically conductive layers disposed to oppose each other with the liquid crystal dielectric layer interposed therebetween, a voltage applying device which applies a DC voltage to the liquid crystal dielectric layer so as to control the dielectric constant of the liquid crystal dielectric layer, a temperature regulating element for changing the temperature of the liquid crystal dielectric layer, and a temperature control device which changes the temperature of the liquid crystal dielectric layer by means of the temperature regulating element so as to cause transition of the liquid crystal dielectric layer between solid phase and liquid phase.

This constitution makes it possible to change the dielectric constant as required in a liquid crystal component module which employs a liquid crystal as the dielectric material, and turn the liquid crystal dielectric layer into solid phase after changing the dielectric constant thereby to provide the liquid crystal component module having stable dielectric constant. The liquid crystal component module can also be made compact and easy to mount on a circuit board.

In a second embodiment of the present invention, the first electrically conductive layer of the liquid crystal component module may be a circuit layer having a circuit pattern and the second electrically conductive layer may be a ground layer.

This constitution makes it possible to provide a liquid crystal component module such as microstrip line having a desired value of dielectric constant.

In the second embodiment of the present invention, the liquid crystal component module may have such a constitution as the liquid crystal dielectric layer is divided into a plurality of regions and the voltage applying device is constituted so as to control the dielectric constant individually for each region of the liquid crystal dielectric layer.

This constitution makes it possible to manufacture a dielectric substrate of which electrical characteristic can be changed from region to region. For example, a microstrip line having a dielectric member formed from a liquid crystal may have different values of characteristic impedance in the different regions thereof, thus enabling it to manufacture an impedance matching circuit for a transmission line.

A fourth embodiment of the present invention is a method of controlling a dielectric constant of a liquid crystal component module having a liquid crystal dielectric layer, comprising the steps of applying a DC voltage to the liquid crystal dielectric layer in liquid phase so as to change the dielectric constant of the liquid crystal dielectric layer, and causing transition of the liquid crystal dielectric layer from liquid phase to solid phase so as to fix the dielectric constant of the liquid crystal dielectric layer.

This method makes it possible to change the dielectric constant as required in a liquid crystal component module (for example, microstrip line, dielectric resonator antenna, antenna matching circuit and circuit component, etc.) which employs liquid crystal as the dielectric material, and turn the liquid crystal dielectric layer into solid phase after changing the dielectric constant thereby stabilizing the dielectric constant.

The present invention has the effect of stabilizing and maintaining the dielectric constant of the liquid crystal dielectric layer.

BRIEF DESCRIPTION OF THE REFERENCE SYMBOLS

Figure 1:
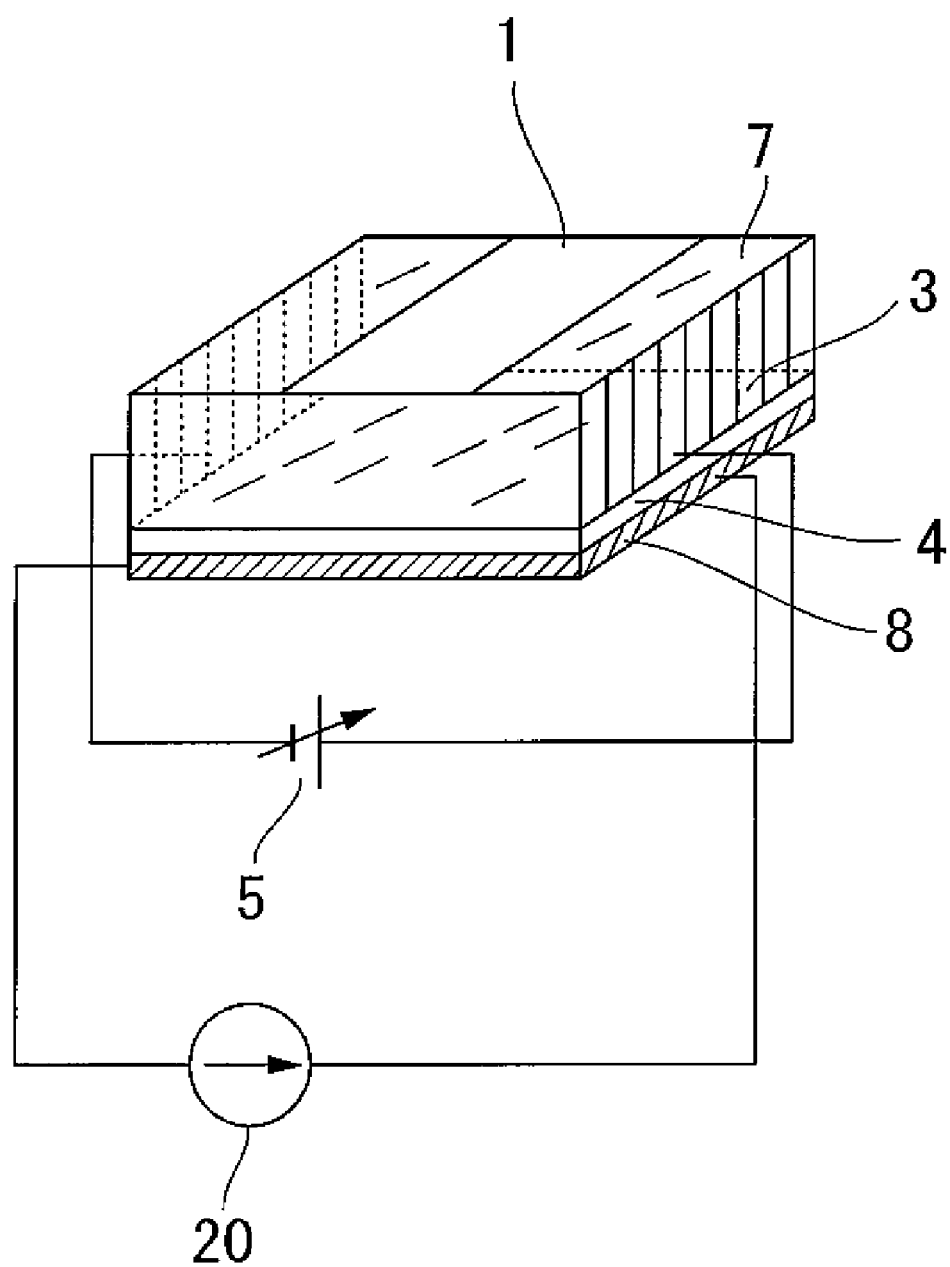
FIG. 1 shows an example of basic constitution of a liquid crystal component module according to the present invention.

1 Circuit
2 Dielectric layer
3 Rubbing surface
4 Ground surface
5 Dielectric constant control voltage source
6 Antenna feeding point
7 Liquid crystal dielectric layer
8 Temperature regulating element
9 Liquid crystal sealing wall
12 Power line
13 Electrode
14 Antenna pattern
20 Temperature regulating element control current source
21 Temperature sensor
22 Temperature detecting section
23 Temperature control section
24 Dielectric constant control section
25 Dielectric constant measuring section
30 Control section
40 Memory section
41 Dielectric constant control table

BEST MODE FOR CARRYING OUT THE INVENTION

Preferred examples of the present invention will now be described with reference to the accompanying drawings. It is understood that the present invention is not limited to the following examples, and constituent elements of the examples may be combined as required.

A liquid crystal component module according to one embodiment of the present invention will be described below with reference to the accompanying drawings. FIG. 1 shows the constitution of this embodiment. In the description that follows, a microstrip line (a signal line over which signals of high frequency such as microwave band are transmitted) will be taken as an example. The microstrip line shown in FIG. 1 comprises a liquid crystal dielectric layer 7, a circuit (first electrically conductive layer) 1 formed on the liquid crystal dielectric layer 7, a rubbing surface 3 of the liquid crystal dielectric layer 7, a ground surface (second electrically conductive layer) 4 disposed on the lower surface of the liquid crystal dielectric layer 7, a dielectric constant control voltage source (voltage applying device) 5 which applies a DC voltage to the liquid crystal dielectric layer 7 so as to polarize the liquid crystal molecules within the liquid crystal dielectric layer 7 and change the dielectric constant, a temperature regulating element 8 which is disposed below the ground surface 4 and regulates the temperature of the liquid crystal dielectric layer 7, and a temperature regulating element control current source (temperature control device) 20 which cools or heats the temperature regulating element 8.

The temperature regulating element 8 is constituted from, for example, a Peltier element, and carries out temperature control by cooling or heating by means of DC current (amperage and polarity) so as to increase or decrease the temperature of the liquid crystal dielectric layer 7. The rubbing surfaces 3 disposed on both side faces of the liquid crystal dielectric layer 7 generate a voltage through friction, so as to orient the liquid crystal molecules in somewhat similar directions when the dielectric constant control voltage is not applied.

Figure 11:
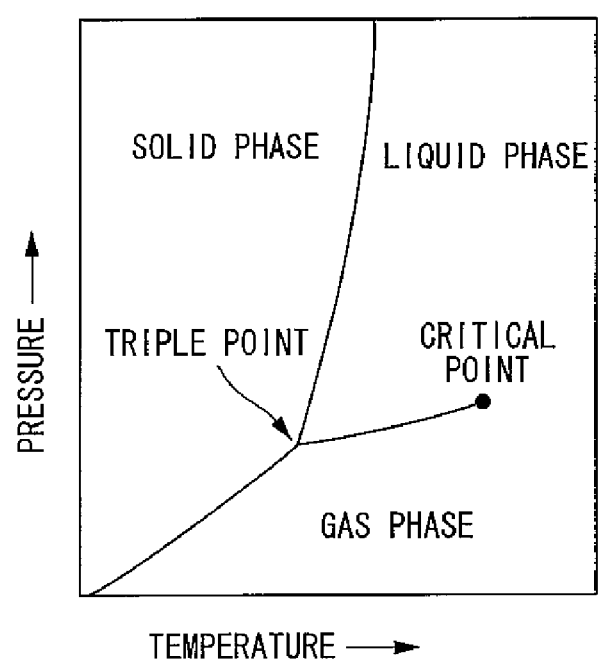
FIG. 11 is a diagram showing phase transition of a liquid crystal depending on temperature and pressure.

The liquid crystal changes the state thereof between solid phase, liquid phase and gas phase depending on the temperature and pressure, as shown in FIG. 11. In the liquid crystal component module shown in FIG. 1, in case the liquid crystal dielectric layer 7 is in solid phase, temperature of the liquid crystal dielectric layer 7 is changed by means of the temperature regulating element 8 while keeping the pressure constant (for example, at the atmospheric pressure) so as to turn the liquid crystal dielectric layer 7 from solid phase to liquid phase (liquid crystal), and is returned to the solid phase after controlling the dielectric constant of the liquid crystal dielectric layer 7 by means of the dielectric constant control voltage source 5.

The liquid crystal dielectric layer 7 may be formed from a material called liquid crystal polymer (LCP), for example. The liquid crystal polymer is a type of plastics which is solid at the normal temperature, having melting point at around 100° C. and relative dielectric constant of about 2.5 to 4 in the microwave band.

Figure 2:
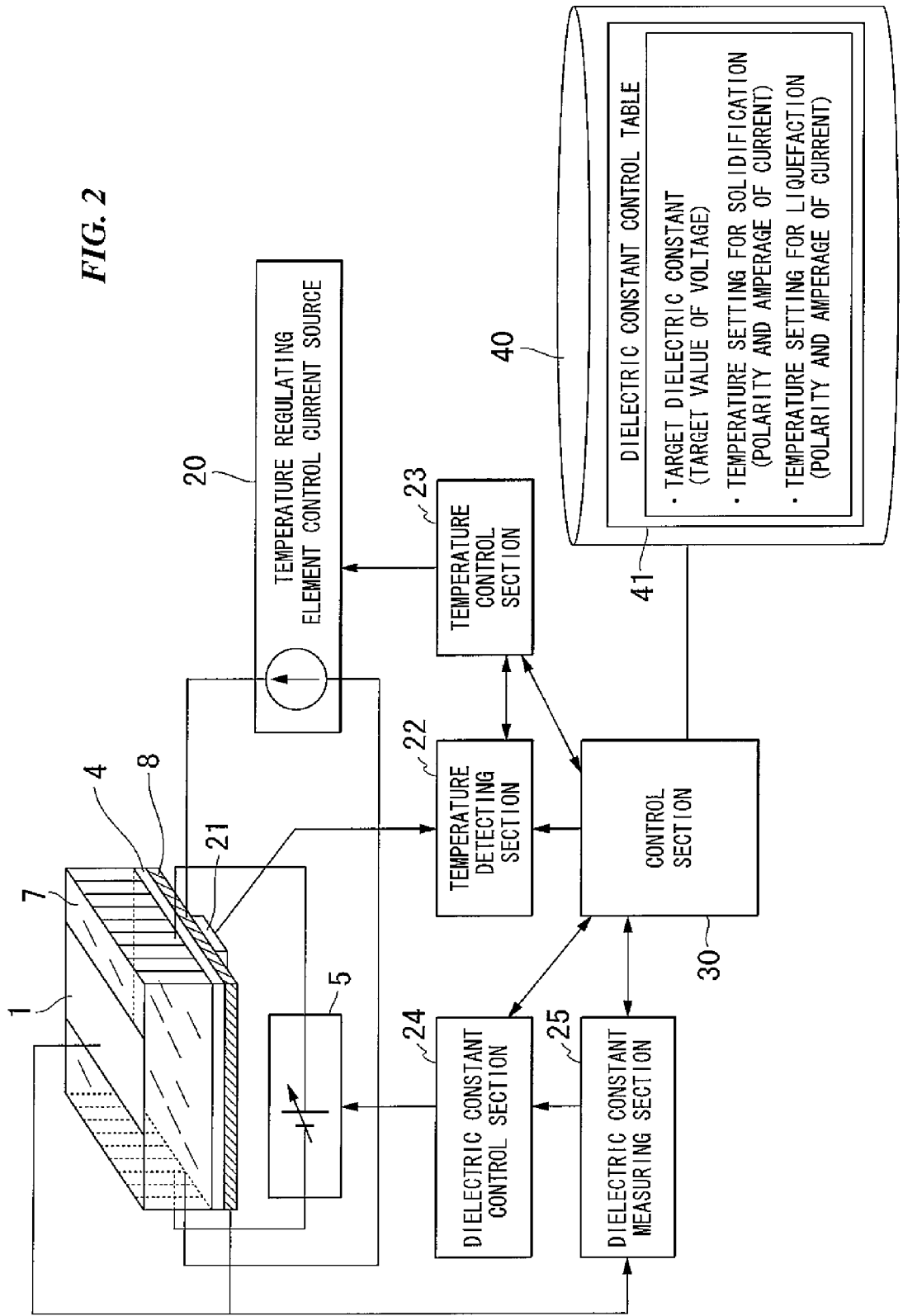
FIG. 2 shows an example of constitution of a control circuit for the liquid crystal component module shown in FIG. 1

FIG. 2 is a block diagram showing the constitution of a control circuit for the liquid crystal component module shown in FIG. 1. In FIG. 2, the temperature regulating element control current source 20 is a DC current source of dual polarities, which supplies DC current of dual polarities (current of opposite polarities corresponding to the cooling and heating operations) to the temperature regulating element 8 so as to cool or heat the liquid crystal dielectric layer 7 as required. The temperature detecting section 22 senses the temperature of the temperature regulating element 8 from the signal input from a temperature sensor 21 attached to the temperature regulating element 8. A temperature control section 23 controls the output current of the temperature regulating element control current source 20 according to the temperature sensing signal from the temperature detecting section 22, so as to maintain the temperature regulating element 8 at the set temperature.

In case high accuracy is not required for the temperature control by the temperature regulating element 8, the temperature sensor 21 and the temperature detecting section 22 may be omitted. In this case, information on the relationship between a target temperature of the temperature regulating element 8 and the amperage and polarity of the output current of the temperature regulating element control current source 20 to achieve the target temperature is stored in a memory section 40, and the output current of the temperature regulating element control current source 20 is controlled so as to provide the amperage and polarity required to achieve the target temperature.

A dielectric constant measuring section 25 measures the dielectric constant of the liquid crystal dielectric layer 7 by applying a sensing signal between the circuit 1 and the ground surface 4. A dielectric constant control section 24 controls the voltage of the dielectric constant control voltage source 5 so that the dielectric constant as measured by the dielectric constant measuring section 25 becomes the target value. In case high accuracy is not required for the control of dielectric constant, the dielectric constant measuring section 25 may be omitted. In this case, information on the relationship between a target dielectric constant and the output voltage of the dielectric constant control voltage source 5 to achieve the target dielectric constant (target voltage) is stored in the memory section 40, and the dielectric constant control voltage source 5 is controlled so as to provide the target voltage. Strictly speaking, the dielectric constant shows a slight change when the dielectric constant is set while maintaining the liquid crystal dielectric layer 7 in liquid phase (liquid crystal) and the liquid crystal dielectric layer is then cooled down to solidify, although the dielectric constant can be controlled more accurately by setting the dielectric constant taking the amount of this change into consideration.

A control section 30 controls the entire control circuit so as to achieve the set temperatures (set temperature to liquefy and set temperature to solidify) of the liquid crystal dielectric layer 7, and controls so as to achieve the target dielectric constant of the liquid crystal dielectric layer 7. The memory section 40 stores a dielectric constant control table 41 which maintains the control information required by the control section 30 for controlling the dielectric constant of the liquid crystal dielectric layer 7. The target dielectric constant is the information on the target value for controlling the dielectric constant of the liquid crystal dielectric layer 7. While the dielectric constant shows a slight change when the liquid crystal dielectric layer 7 is cooled down to solidify, the dielectric constant may be controlled more accurately by setting the dielectric constant while taking the amount of change into consideration. In case the dielectric constant measuring section 25 is omitted, information of the voltage (target voltage) of the dielectric constant control voltage source 5 which gives the target dielectric constant to the liquid crystal dielectric layer 7 may be recorded instead of the target dielectric constant.

Temperature setting for solidification is the information on the temperature required to solidify the liquid crystal dielectric layer 7. Temperature setting for liquefaction is the information on the temperature required to turn the liquid crystal dielectric layer 7 into liquid phase (liquid crystal). In case the temperature sensor 21 and the temperature detecting section 22 are not provided, information on the polarity and amperage of current for solidification is recorded instead of the temperature setting for solidification, and information on the polarity and amperage of current for liquefaction is recorded instead of the temperature setting for liquefaction.

In case the liquid crystal dielectric layer 7 is formed from such a material that is in solid phase at normal temperatures (including the inside temperature of the apparatus, for example from 60 to 70° C.), control of the cooling operation by the temperature regulating element 8 may not be carried out. In this case the information on the temperature setting for solidification and the polarity and amperage of current setting for liquefaction in the dielectric constant control table 41 becomes unnecessary.

Figure 3:
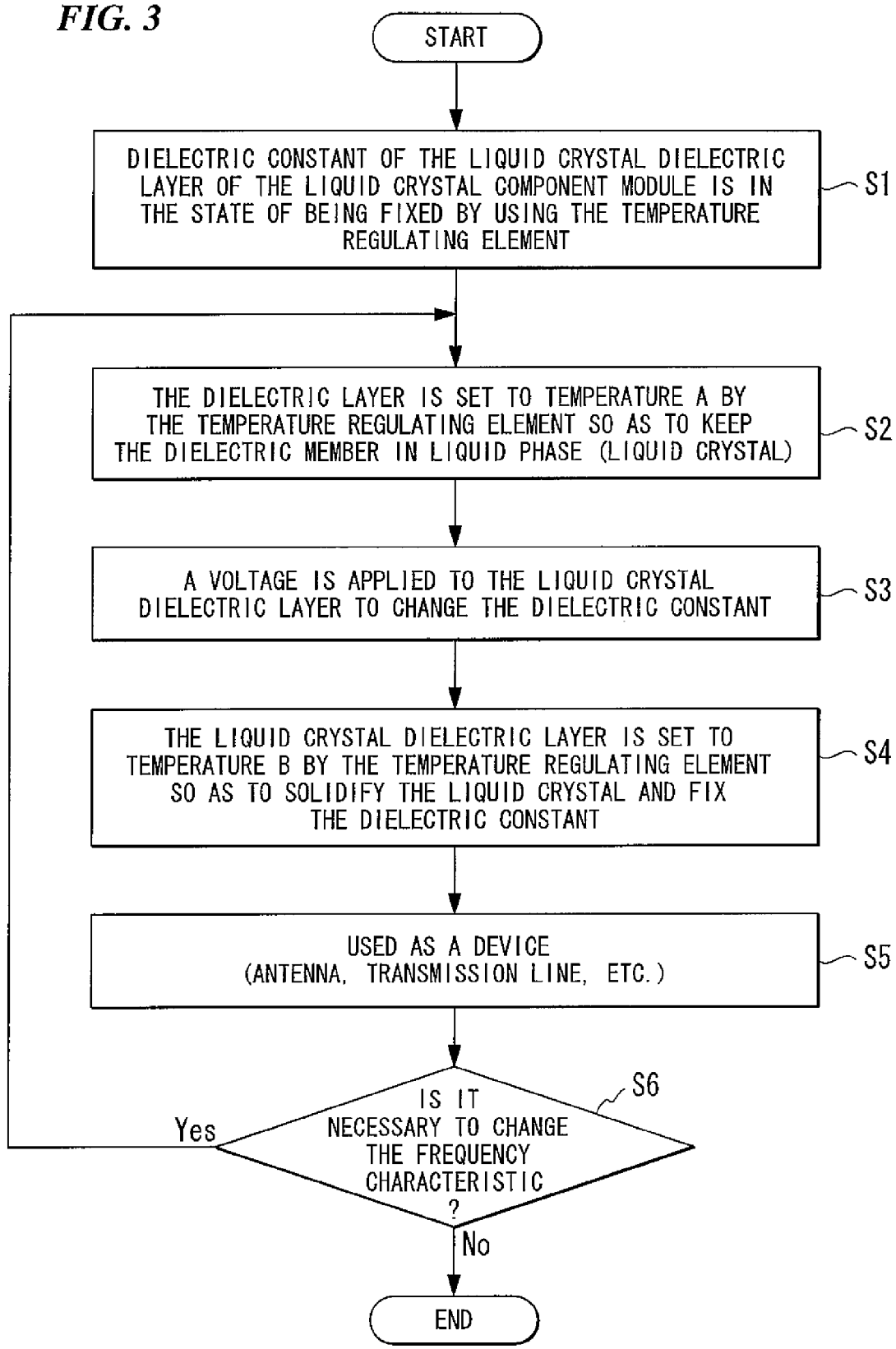
FIG. 3 is a flow chart showing a procedure of controlling the dielectric constant.

Next, the procedure for controlling the dielectric constant of the liquid crystal component module (microstrip line) will be described with reference to FIG. 3. FIG. 3 is a flow chart showing the procedure for controlling the dielectric constant of the liquid crystal component module.

Assume that, in the first place, the liquid crystal dielectric layer 7 has been solidified by cooling the liquid crystal component module by means of the temperature regulating element 8, and the dielectric constant is fixed (step S1). Then the liquid crystal dielectric layer 7 is raised by the temperature regulating element 8 to a temperature A (for example 100° C.) which allows it to keep the dielectric member in liquid phase (liquid crystal) (step S2). A voltage from the dielectric constant control voltage source 5 is applied to a part of the liquid crystal dielectric layer 7 in the state of liquid crystal to change the orientation of the liquid crystal so as to control the dielectric constant of the liquid crystal dielectric layer 7 to a desired value (step S3). Then the temperature of the liquid crystal dielectric layer 7 is changed by the temperature regulating element 8 to a temperature B (for example 10° C.) at which the liquid crystal turns into solid phase and the dielectric constant of the dielectric layer is fixed (step S4). The device is used in the stable state in which the value of dielectric constant is fixed (step S5). When it becomes necessary to change the frequency characteristic of the device, the operation is repeated by returning to step S2 where the liquid crystal dielectric member is turned into liquid crystal state (step S2).

Figure 4:
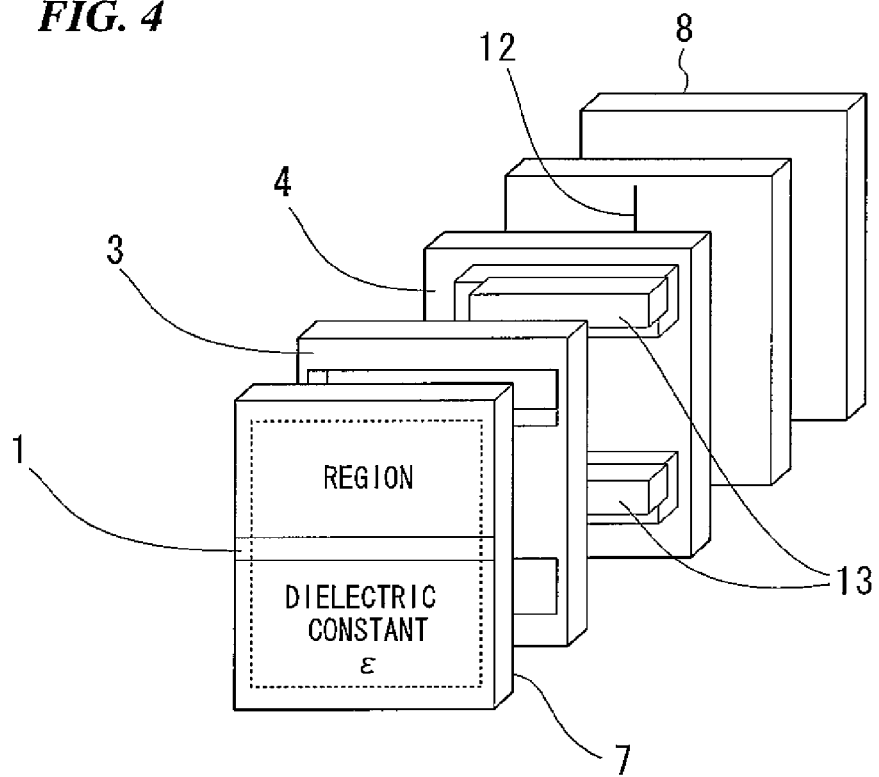
FIG. 4 shows a first example of the constitution of a microstrip line.
Figure 5:
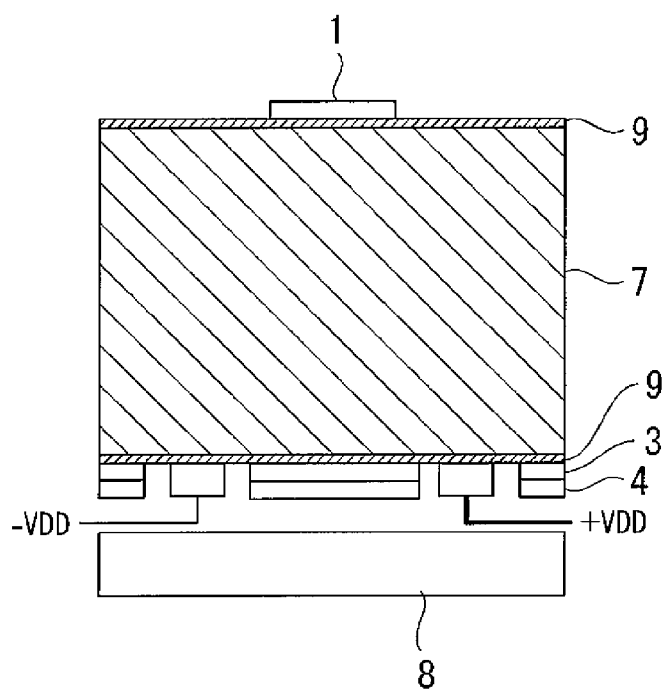
FIG. 5 is a sectional view of the microstrip line shown in FIG. 4.

FIG. 4 shows a first constitution of the microstrip line having the temperature regulating element, exemplifying an application of the liquid crystal component module of the present invention to the microstrip line. FIG. 5 is a sectional view of the microstrip line shown in FIG. 4. The microstrip line shown in FIG. 4 comprises the liquid crystal dielectric layer 7 having the circuit 1, the rubbing surface 3, the ground surface 4, the electrode 13, the power line 12 and the temperature regulating element 8 which are stacked in this order. Dielectric constant of the liquid crystal dielectric layer 7 is controlled by means of the electrode 13 formed in the same level as the ground surface 4. The procedure of controlling the dielectric constant is similar to the procedure shown in FIG. 3. Such a constitution reduces the size of the liquid crystal component module and makes it easier to mount on a circuit board.

It is not necessary to provide the rubbing surface 3 between the liquid crystal dielectric layer 7 and the ground surface 4, and the rubbing surfaces 3 may be provided on both side faces of the liquid crystal dielectric layer 7 as shown in FIG. 1.

Figure 6:
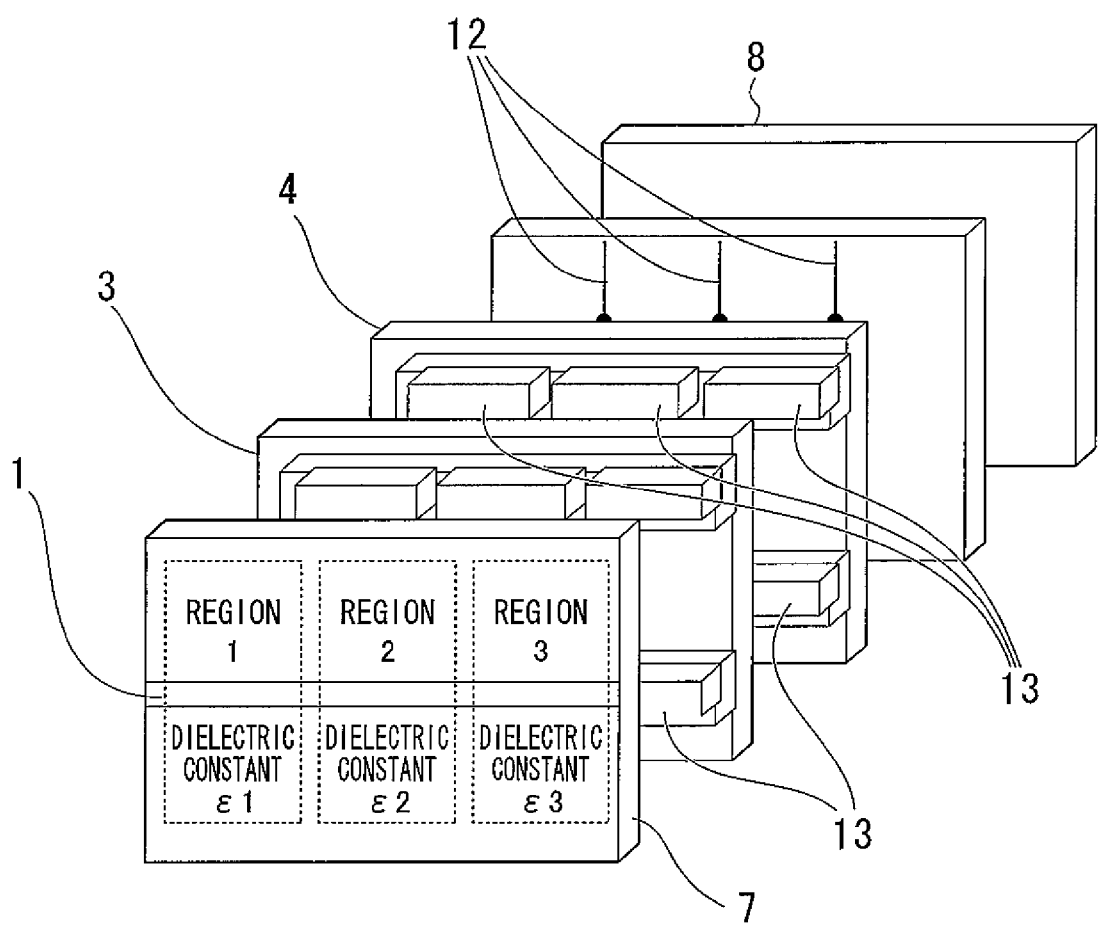
FIG. 6 shows a second example of the constitution of the microstrip line.
Figure 7:
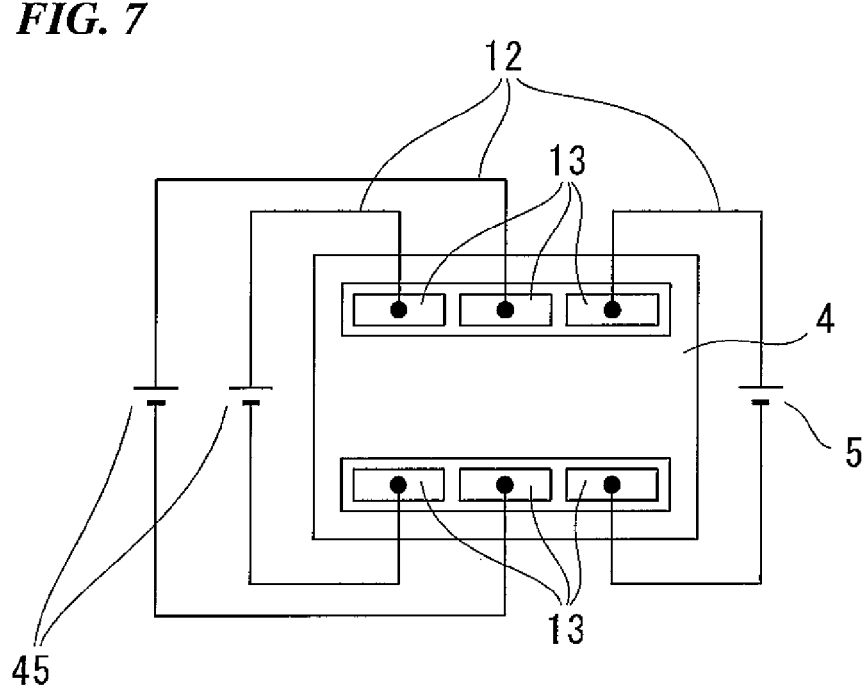
FIG. 7 shows a setup for applying voltages to a plurality of electrodes.
Figure 8:
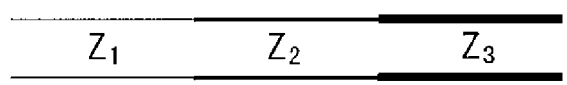
FIG. 8 shows an equivalent circuit of the microstrip line as a distributed element transmission line.

FIG. 6 shows an example of a second constitution of the microstrip line having the temperature regulating element, where the liquid crystal dielectric layer 7 is divided into a plurality of regions and electrode for controlling the dielectric constant is provided for each region. FIG. 7 shows a setup for applying voltages to a plurality of electrodes of the microstrip line shown in FIG. 6. FIG. 8 shows an equivalent circuit of the microstrip line as a distributed constant transmission line. The microstrip line shown in FIG. 6 has three sets of the electrodes 13. As the dielectric constants ($\epsilon1, \epsilon2, \epsilon3$) of the regions (region 1 through region 3) are determined by the voltage applied across the respective electrodes 13, the dielectric constants ($\epsilon1, \epsilon2, \epsilon3$) can be set to different values for the region 1, region 2 and region 3 depending on the position of the respective electrodes 13. For example, with the dielectric constant control voltage source 45 and the electrode 13 being connected with each other by the power line 12 as shown in FIG. 7, a voltage V1 is applied to the region 1, a voltage V2 is applied to the region 2 and a voltage V3 is applied to the region 3. V1, V2 and V3 are different voltages.

This constitution makes it possible to manufacture a dielectric substrate or the like where electrical characteristic of the microstrip line shown in FIG. 6 can be changed from region to region. Thus an impedance matching circuit for the transmission line can be made where characteristic impedance of the microstrip line of which the dielectric member is formed from the liquid crystal is varied from region to region. For example, the impedance matching circuit can be made where the circuits having characteristic impedances Z1, Z2 and Z3 are connected in series in the microstrip line shown in FIG. 8. This enables it to carry out impedance matching between the circuits having different impedances. It is also made possible to make a dielectric substrate having even larger surface area which expands the range of adjusting the impedance matching between the components mounted on the dielectric substrate. While the example shown in FIG. 6 has three regions, there is no restriction on the number of regions.

Figure 9:
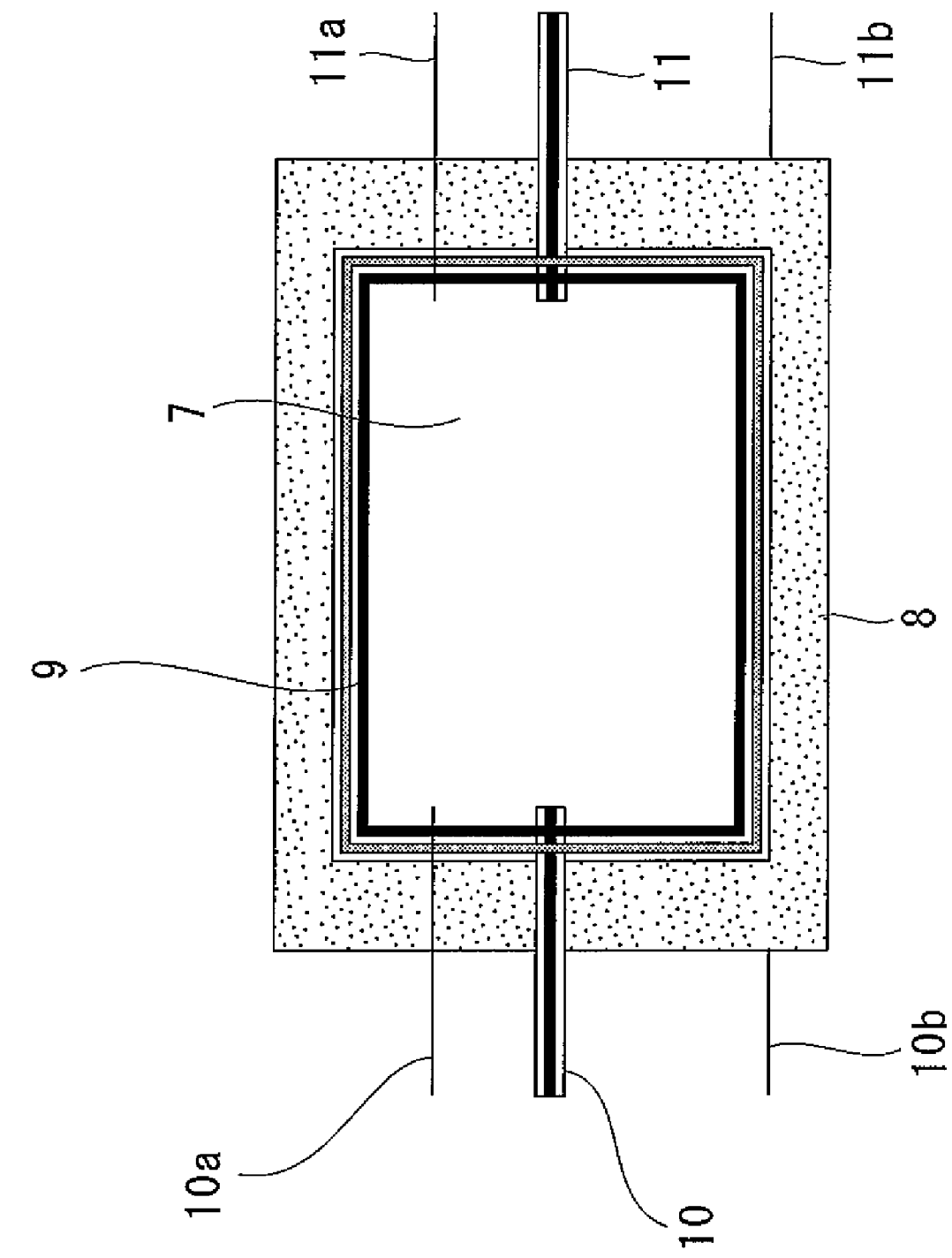
FIG. 9 shows an example where the entire surface of liquid crystal component module is covered by a temperature regulating element.

FIG. 9 shows an example of constitution of the liquid crystal component module where the entire surface of the liquid crystal component module is covered by the temperature regulating element. In the example shown in FIG. 9, the liquid crystal dielectric layer 7 is enclosed by a liquid crystal sealing wall 9 and is further covered by the temperature regulating element 8, where reference numeral 10 denotes input signal lines and 11 denotes output signal lines. Provided in addition to the signal lines 10 and 11 are dielectric constant control lines 10a, 11a for controlling the dielectric constant of the liquid crystal dielectric layer 7, and temperature control lines 10b, 11b for controlling the temperature of the temperature regulating element 8. This constitution makes it possible to improve the thermal efficiency of the temperature regulating element 8 in heating or cooling the liquid crystal dielectric layer 7, thus allowing it to form a variable capacitor or the like.

Figure 10:
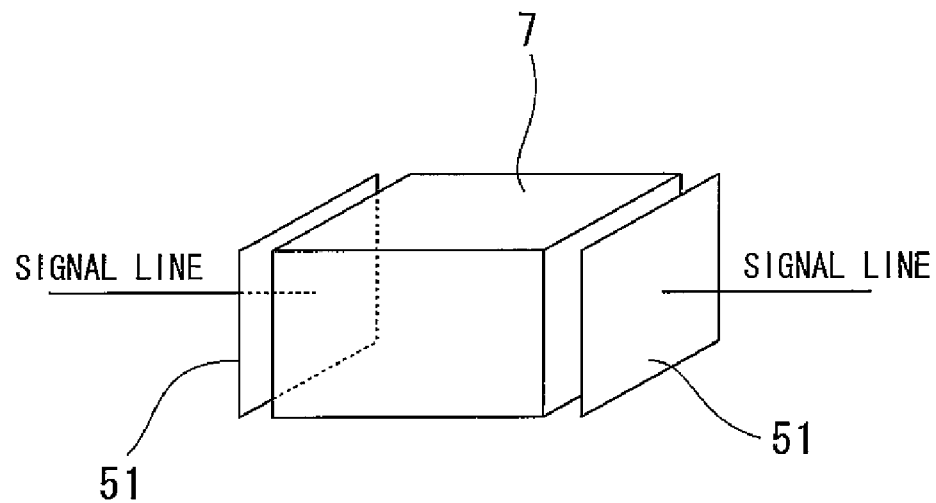
FIG. 10 shows an example where a capacitor is constituted from the liquid crystal dielectric layer.

The liquid crystal component module of the present invention can be used as a capacitor, a reactance element or a resistor. FIG. 10 shows an example of constitution of a capacitor employing the liquid crystal dielectric layer, where metal plates 51 are disposed to oppose each other with the liquid crystal dielectric layer 7 interposed therebetween. The liquid crystal dielectric layer 7 is covered by the temperature regulating element 8 over the entire surface thereof as shown in FIG. 9. When applied to a reactance element, it is constituted by surrounding the liquid crystal dielectric layer 7 by a signal line in the configuration of coil. A resistor is made in a constitution similar to that of capacitor.

Now the range of adjusting the relative dielectric constant $\epsilon_r$ of the liquid crystal dielectric layer 7 will be described.

The relative dielectric constant $\epsilon_r$ is controlled in a range not higher than 3.0 for applications operating in the microwave band such as microstrip line and dielectric resonator antenna. Liquid crystals which can be used in applications operating in the microwave band such as microstrip line and dielectric resonator antenna include liquid crystal polymer (LCP). The LCP is a kind of plastics which is solid at the normal temperature, and is commercially available in the form of product having melting point of about 100° C. and dielectric constant of about 2.5 to 4.0.

Figure 12:
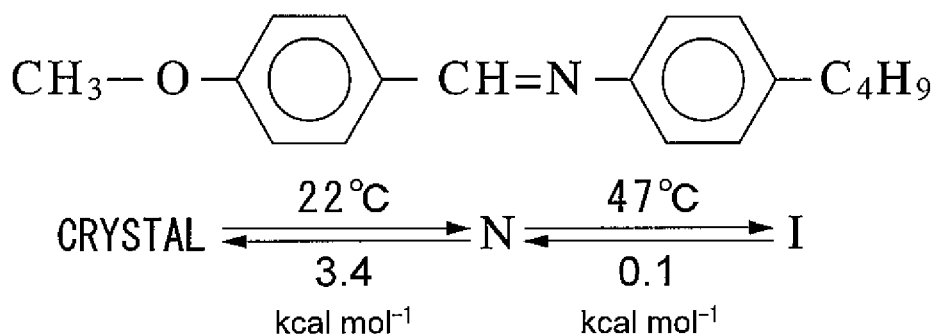
FIG. 12 is chemical formula and phase transition diagram of MBBA.
Figure 12:
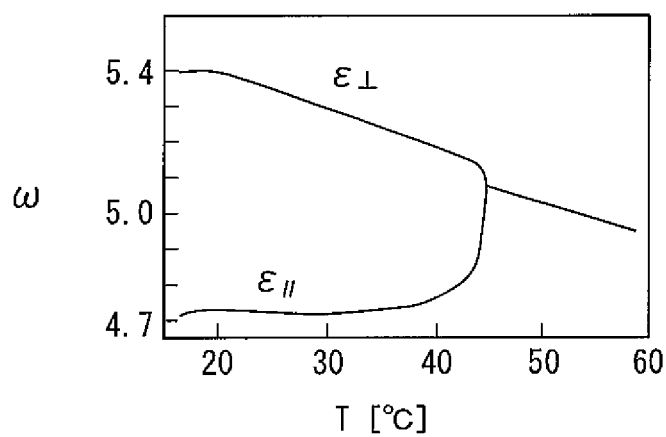
Figure 13:
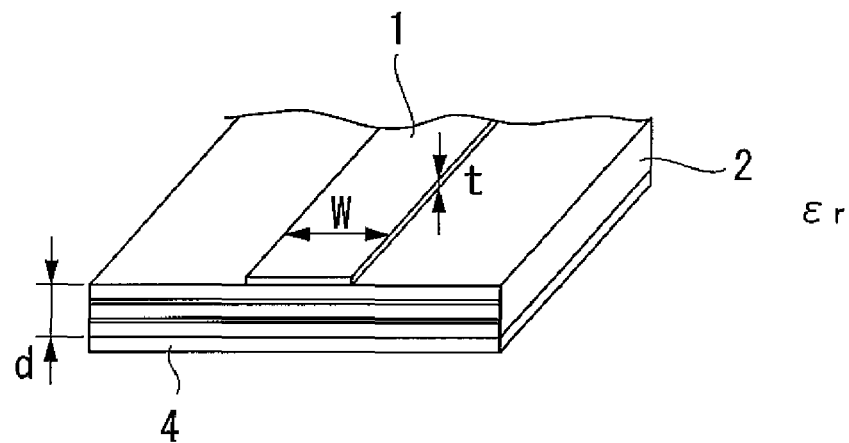
FIG. 13 shows an example of microstrip line of the prior art.
Figure 14:
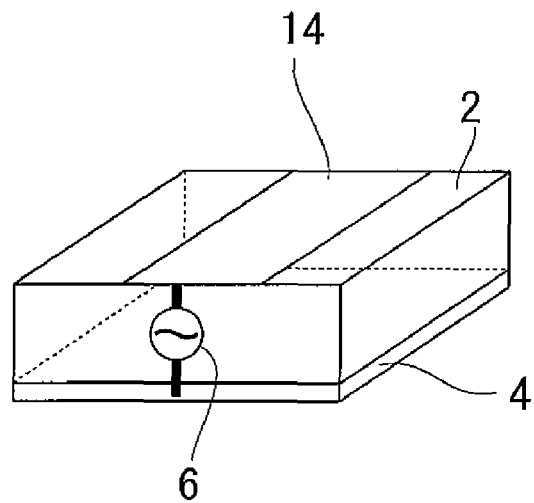
FIG. 14 shows an example of dielectric resonator antenna of the prior art.
Figure 15:
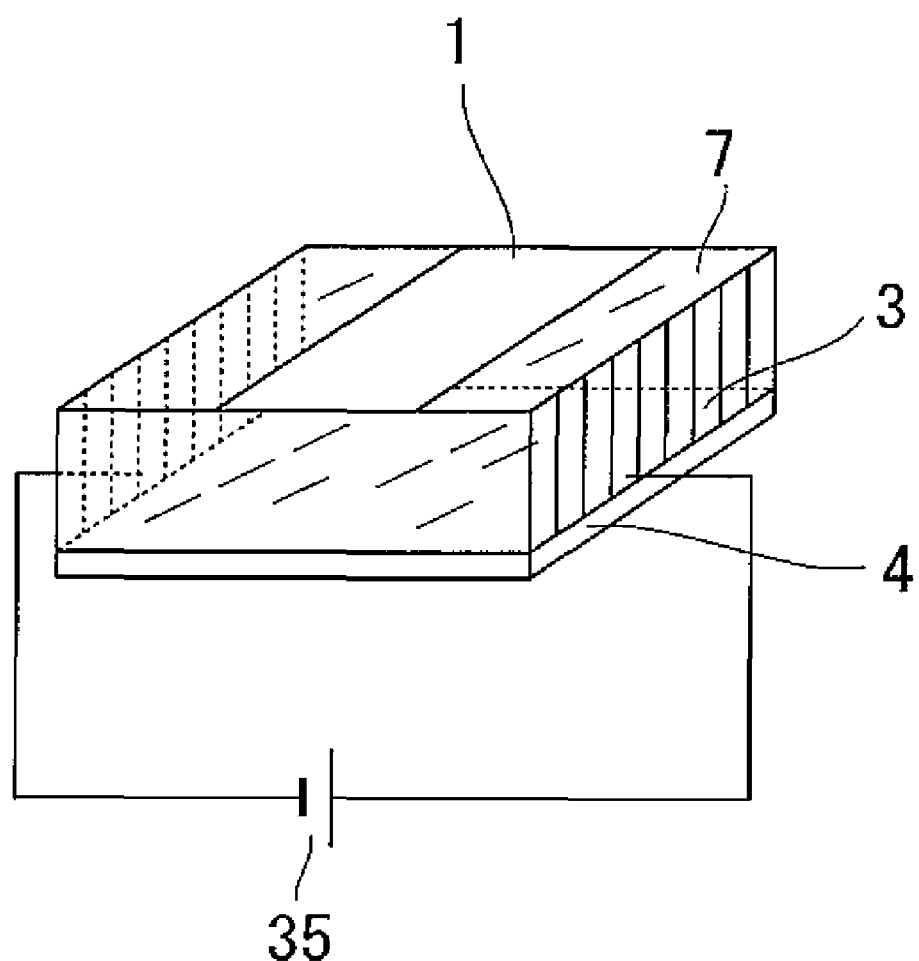
FIG. 15 shows an example of microstrip line of the prior art of which dielectric constant is variable.

A capacitor and a reactance element constituted from the liquid crystal dielectric layer allow it to achieve the required values of capacitance and reactance, respectively, by controlling the relative dielectric constant in a range from about 1 to 6, since the dielectric loss is negligible at low frequencies. In the microwave region, the relative dielectric constant $\epsilon_r$ is controlled in a range not higher than 3.0. Liquid crystals which can be used include mesogen-N(4-methoxybenzylidene)-4-butylaniline (MBBM). FIG. 12 shows the chemical formula and phase transition diagram of MBBA.

A resistor constituted from the liquid crystal dielectric layer allows it to achieve the required values of resistance by controlling the relative dielectric constant in a range from about 1 to 6. The higher the relative dielectric constant, the higher the resistance of the resistor can be obtained. The same MBBA as shown in FIG. 12 can be used as the liquid crystal. Other liquid crystals which satisfy the requirements for the temperature characteristic and dielectric constant may also be used, such as a mixture of MBBA and EBBA.

Thus it is made possible to reduce in size and manufacture electronic components (liquid crystal component module) such as microstrip line, dielectric resonator antenna, impedance matching circuit, capacitor, reactance element and resistor which have the desired electrical characteristics, by selecting the proper type of liquid crystal for the application and controlling the dielectric constant of the liquid crystal dielectric layer, thereby enabling it to mount the electronic components easily on the circuit board.

According to the present invention, as described above, dielectric constant can be changed as required in a microstrip line, a dielectric resonator antenna, a antenna matching circuit and the circuit elements thereof or the like, which uses a liquid crystal as the dielectric material, and it is made possible to provide a liquid crystal component module (electronic component) which has a stable value of dielectric constant by solidifying the liquid crystal dielectric layer after changing the dielectric constant. It is also made possible to precisely switching the frequency of a signal to be processed, by using a circuit board having the liquid crystal component module, which has variable electrical characteristic mounted thereon, in the RF circuit of the communication module.

INDUSTRIAL APPLICABILITY

The present invention has such effects that it is enabled to adjust the dielectric constant of liquid crystal dielectric layer when a liquid crystal is used as the dielectric material (dielectric layer), and the dielectric constant of the liquid crystal dielectric layer can be maintained at a stable level. Therefore the present invention is useful for liquid crystal component module, a method for controlling a dielectric constant for the liquid crystal component module and other applications.

The invention claimed is:

1. A liquid crystal component module comprising:
    a liquid crystal dielectric layer;
    a voltage applying device which applies a DC voltage to said liquid crystal dielectric layer so as to control the dielectric constant of said liquid crystal dielectric layer;
    a temperature regulating element for changing the temperature of said liquid crystal dielectric layer; and
    a temperature control device for changing the temperature of said liquid crystal dielectric layer with said temperature regulating element so as to cause transition of said liquid crystal dielectric layer between solid phase and liquid phase, wherein
    the temperature regulating element transitions said liquid crystal dielectric layer from the solid phase to the liquid phase, and
    the module is used as a device such as an antenna or a transmission line.

2. The liquid crystal component module according to claim 1, wherein said first electrically conductive layer is a circuit layer having a circuit pattern and said second electrically conductive layer is a ground layer.

3. The liquid crystal component module according to claim 1, wherein said liquid crystal dielectric layer is divided into a plurality of regions, and said voltage applying device is constituted so as to control the dielectric constant individually for each region of said liquid crystal dielectric layer.

4. A method of controlling a dielectric constant of a liquid crystal component module having a liquid crystal dielectric layer, comprising the steps of:
    applying a DC voltage to said liquid crystal dielectric layer in liquid phase so as to change the dielectric constant of said liquid crystal dielectric layer; and
    causing transition of said liquid crystal dielectric layer from liquid phase to solid phase so as to fix the dielectric constant of said liquid crystal dielectric layer,
    wherein the module is used as a device such as an antenna or a transmission line.

5. The liquid crystal component module according to claim 1, wherein the voltage applying device controls the dielectric constant of the liquid crystal dielectric layer so that the dielectric constant becomes a desired value.

6. The liquid crystal component module according to claim 5, wherein when the dielectric constant of the liquid crystal dielectric layer has reached the desired value, the temperature control device causes the liquid crystal dielectric layer to transition from the liquid phase to the solid phase.

7. The liquid crystal component module according to claim 5, wherein when the temperature control device causes the liquid crystal dielectric layer to transition from the solid phase to the liquid phase, the voltage applying device controls the dielectric constant of the liquid crystal dielectric layer so that the dielectric constant becomes the desired value.

8. The liquid crystal component module according to claim 1, wherein when it becomes necessary to change frequency characteristics of the device, a control unit causes the liquid crystal dielectric layer to transition from the solid phase to the liquid phase.

9. A liquid crystal component module comprising:
    a liquid crystal dielectric layer;
    a voltage applying device which applies a DC voltage to said liquid crystal dielectric layer so as to control the dielectric constant of said liquid crystal dielectric layer;
    a temperature regulating element for changing the temperature of said liquid crystal dielectric layer; and
    a temperature control device for changing the temperature of said liquid crystal dielectric layer with said temperature regulating element so as to cause transition of said liquid crystal dielectric layer between solid phase and liquid phase, wherein
    the temperature regulating element transitions said liquid crystal dielectric layer from the solid phase to the liquid phase, and
    the temperature control device encompasses the liquid crystal dielectric layer.

\* \* \* \* \*